(12) United States Patent
Chhabra et al.

(10) Patent No.: US 6,179,073 B1
(45) Date of Patent: Jan. 30, 2001

(54) HYBRID TRACK FOR A VEHICLE

(75) Inventors: Nitin Chhabra, St. Petersburg; Stuart Wilkinson, Zephyrhills, both of FL (US)

(73) Assignee: University of South Florida, Tampa, FL (US)

( * ) Notice: Under 35 U.S.C. 154(b), the term of this patent shall be extended for 0 days.

(21) Appl. No.: 09/322,141

(22) Filed: May 28, 1999

Related U.S. Application Data

(60) Provisional application No. 60/086,997, filed on May 28, 1998.

(51) Int. Cl.[7] ................................................. B62D 55/00
(52) U.S. Cl. ........................... 180/9.1; 180/9.44; 180/6.7; 305/52
(58) Field of Search ................... 180/9, 9.1, 9.44, 180/7.1, 9.42, 6.7; 280/28.5; 365/60, 52

(56) References Cited

U.S. PATENT DOCUMENTS

| | | | |
|---|---|---|---|
| 2,751,259 | * 6/1956 | Bonmartini | 305/52 |
| 2,867,480 | * 1/1959 | Cushman | 305/52 |
| 3,591,241 | * 7/1971 | Allen | 180/7.1 |
| 3,746,112 | 7/1973 | Ilon | 180/6.2 |
| 3,872,940 | * 3/1975 | Gambini | 305/52 |
| 4,715,460 | 12/1987 | Smith | 180/7.1 |
| 4,823,900 | 4/1989 | Farnam | 180/6.5 |
| 5,186,270 | 2/1993 | West | 180/6.62 |

FOREIGN PATENT DOCUMENTS

| | | | |
|---|---|---|---|
| 1 298 009 | * 6/1969 | (DE) | 180/7.1 |
| 3841971 | * 6/1990 | (DE) | 180/7.1 |
| 601373 | * 1/1960 | (IT) | 305/52 |
| 756078 | * 1/1960 | (GB) . | |

* cited by examiner

Primary Examiner—Daniel G. DePumpo
(74) Attorney, Agent, or Firm—Howard & Howard

(57) ABSTRACT

A vehicle (10) includes a pair of hybrid track assemblies (12) mounted on opposite sides of the longitudinal axis (A) of the framework (11) of the vehicle (10) for cooperating to steer the vehicle (10). Each of the hybrid track assemblies (12) includes a first lead track (14) entrained about a first plurality of wheels (16) and a second lead track (18) entrained about a second plurality of wheels (20). A plurality of first lead rollers (26) are rotatably supported in spaced and parallel relationship to one another along the longitudinal axis of the first lead track (14). A plurality of second lead rollers (38) are rotatably supported in spaced and parallel relationship to one another along the longitudinal axis of the second lead track (18). The assembly is characterized by the first and second axes of the first lead rollers (26) and second lead rollers (38) being disposed in opposite directions, i.e., a herringbone configuration. By independent drive of each of the four tracks to provide various combinations of drive direction and speed for each respective track, the force vectors created by the rollers (26) and (38) engaging the surface add and subtract to effect movement in any direction.

11 Claims, 4 Drawing Sheets

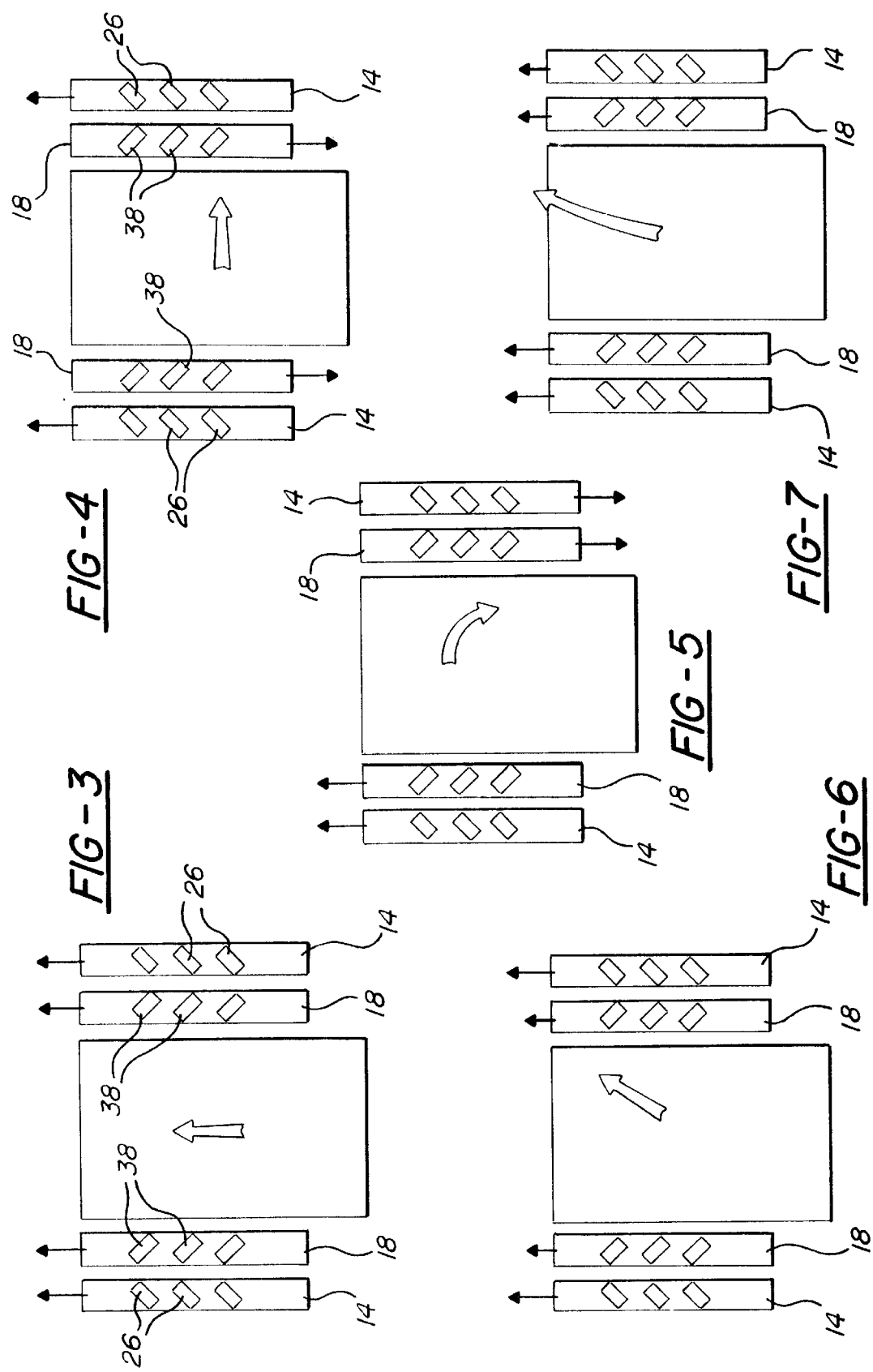

HYBRID TRACK FOR A VEHICLE

RELATED APPLICATION

This application claims priority to and all of the benefits of U.S. Provisional Patent Application Serial No. 60/086,997 filed May 28, 1998.

BACKGROUND OF THE INVENTION

1. Field of the Invention

This invention relates to omnidirectional positioning of vehicles.

2. Description of the Prior Art

The system for the movement of robots, forklift trucks, platforms, industrial and construction equipment, mobile chairs and a wide variety of other vehicles are continually being improved. There is particular need for improvements in systems which allow linear or curved movement in any direction from a point as well as rotation about a point.

In order to improve the movement, various systems have been developed which utilize rollers rotatably supported about the periphery of wheels. Such systems are shown in U.S. Pat. No. 3,746,112 to Ilon, U.S. Pat. No. 4,715,460 to Smith, U.S. Pat. No. 4,823,900 to Farnam and U.S. Pat. No. 5,186,270 to West. The U.S. Pat. No. 3,746,112 patent to Ilon discloses a four wheeled vehicle with each wheel having rollers supported about the periphery with the axes of rotation of the rollers on a wheel extending transversely to the axes of rotation of the rollers on the wheels on the opposite side of the vehicle and at the opposite end of the vehicle. This system is very maneuverable without the need to steer any of the wheels. However, depending upon the load, the contact pressure between each of the rollers and the surface can be very high, sometimes too high.

SUMMARY OF THE INVENTION AND ADVANTAGES

This invention provides an improved assembly for omnidirectional movement of a vehicle over a surface by mounting a hybrid track assembly to each side of a vehicle for cooperating to steer the vehicle. A first lead track has a longitudinal axis entrained about a first plurality of wheels and a second lead track has a longitudinal axis entrained about a second plurality of wheels, the longitudinal axes of the tracks being parallel. A plurality of first lead rollers are rotatably supported in spaced and parallel relationship to one another along the longitudinal axis of the first lead track with each of the first lead rollers being supported for rotation about a first lead axis. A plurality of second lead rollers are rotatably supported in spaced and parallel relationship to one another along the longitudinal axis of the second lead track with each of said second lead rollers being supported for rotation about a second lead axis. The assembly characterized by said first and second lead axes of the first lead rollers and second lead rollers respectively being disposed in opposite directions.

It will be appreciated that the subject invention provides an improved assembly for omnidirectional movement of a vehicle over a surface which exhibits superior maneuverability in a tracked vehicle by utilizing a hybrid track assembly. For given overall dimensions and gross weight, a tracked vehicle will have a larger contact area than a wheeled vehicle with the support surface. Consequently, the ground contact pressure, and hence the sinkage and motion resistance, will be lower than an equivalent wheeled vehicle. Accordingly, the subject invention incorporates the advantages of a tracked vehicle with the advantages of rollers without the need for steering mechanisms. Another advantage of the subject invention is the improved drawbar-to-weight ratio.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a schematic view of the vehicle moving in a rectilinear fore and aft direction;

FIG. 4 is a schematic view of the vehicle moving in a sideways direction;

FIG. 5 is a schematic view of the vehicle moving in a rotational direction;

FIG. 6 is a schematic view of the vehicle moving in a diagonal direction;

FIG. 7 is a schematic view of the vehicle moving in a turn or curved direction;

DETAILED DESCRIPTION OF THE PREFERRED EMBODIMENT

Referring to the Figures, wherein like numerals indicate like or corresponding parts throughout the several views, an omnidirectional vehicle having a longitudinal axis (A) is generally shown at 10. The vehicle 10 includes a pair of hybrid track assemblies each generally shown at 12 and mounted on opposite sides of the longitudinal axis (A) of the framework 11 of the vehicle 10 for cooperating to steer the vehicle 10.

Figure 8:
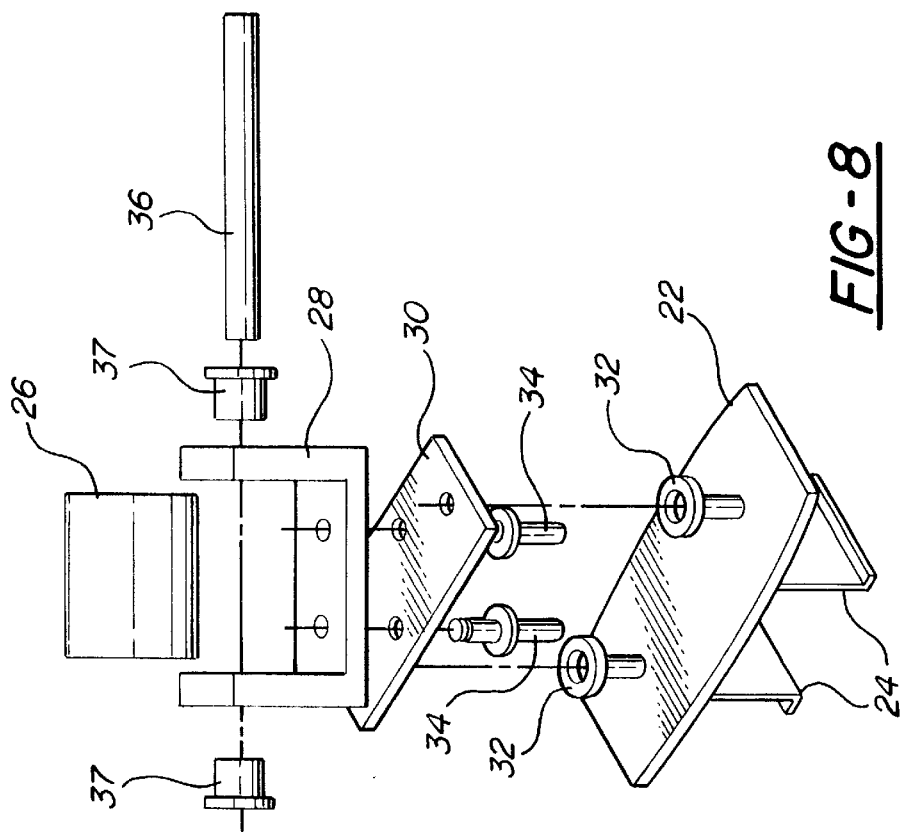
FIG. 8 is an exploded view of a track link and roller assembly.

Since each of the hybrid track assemblies 12 are identicle to one another, except for being mirror images of one another, the description will first continue in the singular as to only one hybrid track assembly 12. Each of the hybrid track assemblies 12 includes a first lead track, generally indicated at 14, and having a longitudinal axis entrained about a first plurality of wheels 16 and a second lead track, generally indicated at 18, and having a longitudinal axis entrained about a second plurality of wheels 20. The longitudinal axes of the tracks 14 and 18 are parallel to one another and to the longitudinal axis (A) of the vehicle 10. As illustrated in FIG. 8, each of the tracks 14 and 18 include a plurality of links, each of which comprises a mounting plate 22 and depending legs 24 for alignment with the wheels 16 and 20. The mounting plates 22 are interconnected for pivotal movement relative to one another to form an endless track entrained about the wheels 16 and 20, the wheels engaging between the legs 24.

A plurality of first lead rollers 26 are rotatably supported in spaced and parallel relationship to one another along the longitudinal axis of the first lead track 14. More specifically, a U-shaped support bracket 28 is sandwiched to each mounting plate 22 with a base plate 30 and washers 32 by rivets 34. Each roller 26 is rotatably supported by a roller shaft 36 which is, in turn, supported by bushings 37 in the legs of the U-shaped support bracket 28 whereby each of the first lead rollers 26 is supported for rotation about a first lead axis, i.e., the axis of the roller shaft 36. In like fashion, a plurality of second lead rollers 38 are rotatably supported in spaced and parallel relationship to one another along the longitudinal axis of the second lead track 18, each of the second lead rollers 38 being supported for rotation about a second lead axis, again defined by the roller shaft 36 thereof.

Figure 1:
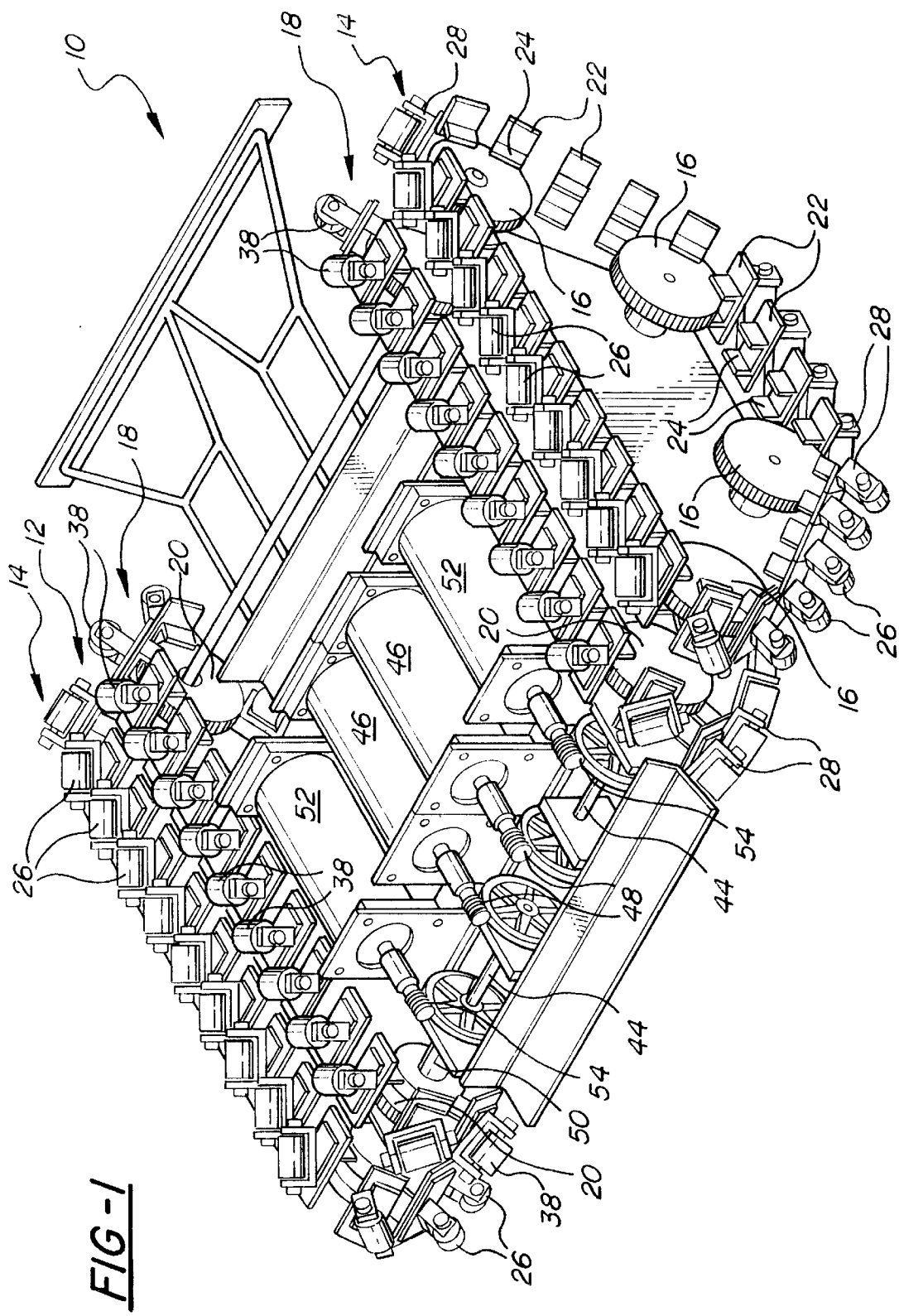
FIG. 1 is a perspective view of a preferred embodiment.
Figure 2:
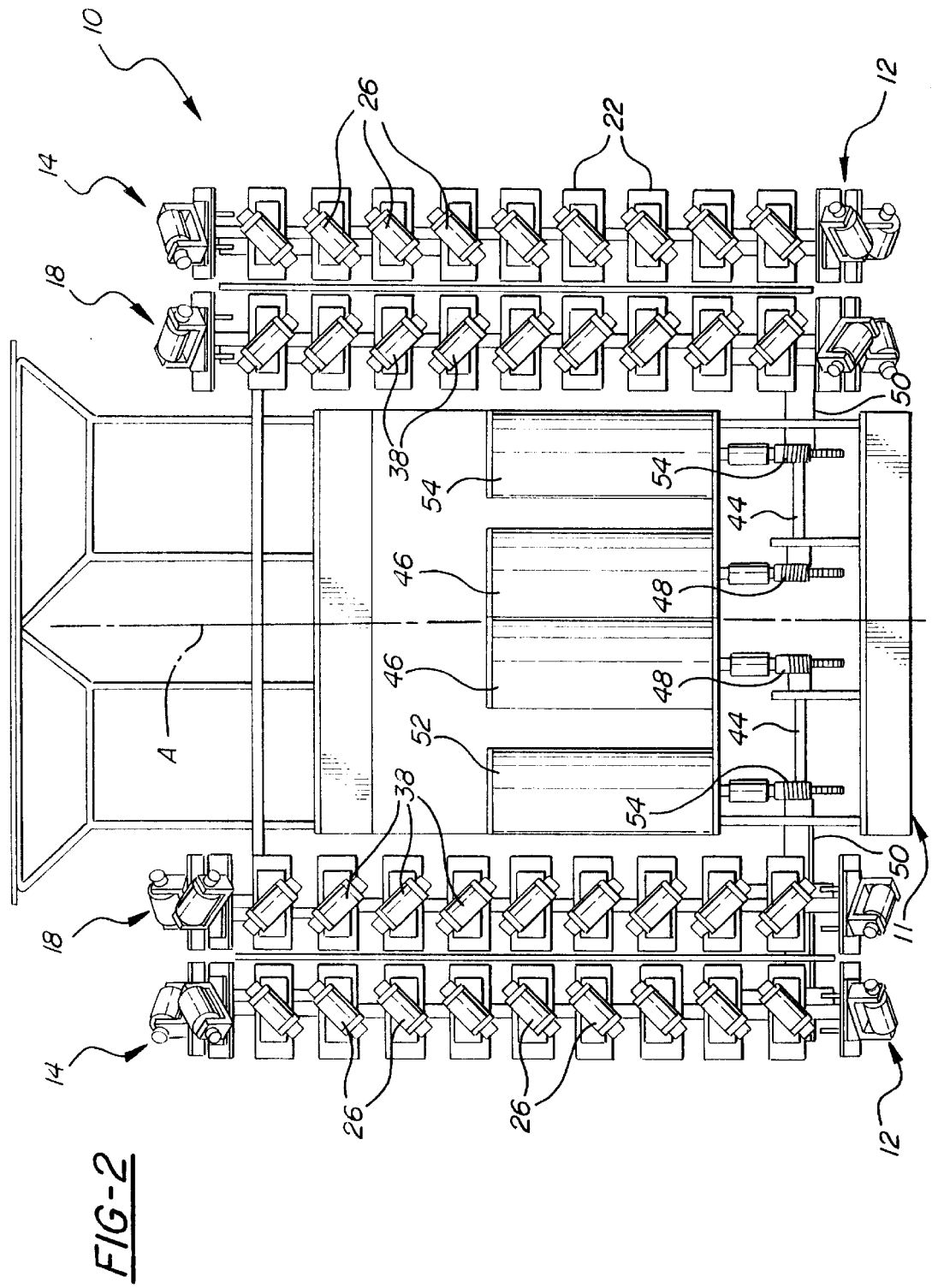
FIG. 2 is a plan view of the vehicle of FIG. 1.

The assembly is characterized by the first and second lead axes of the first lead rollers 26 and second lead rollers 38 being disposed in opposite directions. When viewed in plan as illustrated in FIG. 2, the rollers 26 and 38 are disposed in a herringbone configuration, but with the herringbone of the left side being opposite or the mirror image of the herringbone of the other or right side. The tracks and rollers are analogous to the lead of a screw whereby the disposition of the rollers 26 establishes a right or left hand lead while the rollers 38 establish a lead in the opposite direction. The first and second lead axes of the first lead rollers 26 and second lead rollers 38 are disposed at an angle between 30° and 60° relative to the longitudinal axes of the tracks, but preferably at an angle of 45° relative to the longitudinal axes of the tracks. The first lead axis is preferably disposed at an angle of 90° relative to the second lead axis, i.e., the first and second lead axes of the first lead rollers 26 and second lead rollers 38 are disposed at an angle of 90° relative to one another. The lead axes of the first lead rollers 26 of one or left pair of track assemblies 12 is parallel to the lead axes of the first lead rollers 26 of the other or right pair of track assemblies 12 and the lead axes of the second lead rollers 26 of the left or one pair of track assemblies 12 is parallel to the lead axes of the second lead rollers 26 of the other or right pair of track assemblies 12.

Figure 9:
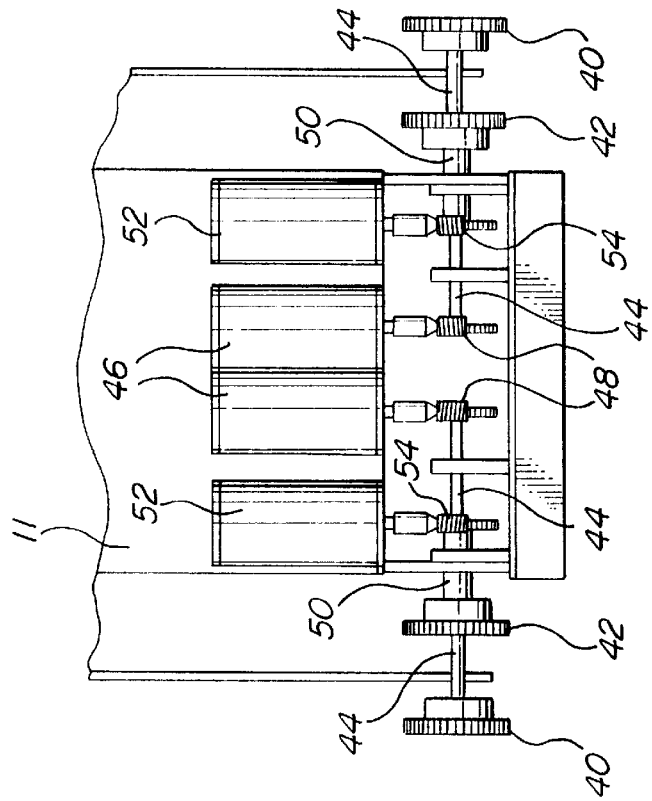
FIG. 9 is a plan view of the drive system.

As shown in FIG. 9, one of the wheels 16 supporting the first lead track 14 is a first drive wheel 40 for moving the first lead track 14 on the left side of the vehicle as shown and one of the wheels 20 supporting the second lead track 18 is a second drive wheel 42 for moving the second lead track 18 on the left side of the vehicle as shown. A first drive connection, comprising a first shaft 44, drives the first drive wheel 40. The first shaft 44 is driven by a first motor 46 through worm gearing 48. A second drive connection, comprising a second shaft 50, drives the second drive wheel 42. The second shaft 50 surrounds the first shaft 44 and is driven by a second motor 52 through worm gearing 54. Accordingly, the first lead track 14 is driven independently of the second lead track 18 and the second lead track 18 is driven independently of the first lead track 14. The drive system for the pair of tracks 14 and 18 on the right or opposite side of the vehicle is identicle except they are mirror images of one another.

Therefore, the first drive connection or shaft 44 associated with the first lead track 14 on one side of the vehicle 10 is independent of the first drive connection or shaft 50 associated with the first lead track 14 on the other side of the vehicle 10 and the second drive connection or shaft 50 associated with the second lead track 18 on the one side of the vehicle 10 is independent of the second drive connection or shaft 44 associated with the second lead track 18 on the other side of the vehicle 10. An appropriate transmission and computer control sequentially operates the motors in various combinations to move the vehicle in omnidirections.

Such omnidirectional movements are illustrated in FIGS. 3 through 7 which include force vectors, the resultant of which causes movement in the desired direction. FIG. 3 illustrates both tracks 14 and 18 on each side of the vehicle being driven in the same direction by the motors so that the vehicle moves rectilinearly or linearly in either the fore or aft direction. FIG. 4 illustrates sideways movement by the two first tracks 14 being driven in opposite directions and the two second tracks 18 being driven in opposite directions. Said another way, the second track 18 on one side is driven in the same direction as the first track 14 on the other side whereas the respective companion tracks are driven in the opposite direction. FIG. 5 illustrates circular movement by driving both of the first 14 and second 18 tracks one side of the vehicle in the opposite direction to the first 14 and second 18 tracks on the other side of the vehicle. FIG. 6 illustrates diagonal movement by driving the first 14 and second 18 tracks on each side at different speeds. FIG. 7 illustrates turning or curved movement by driving the first 14 and second 18 tracks on one side at the same speed but at a different speed than the first 14 and second 18 tracks on the other side of the vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein that which is prior art is antecedent to the characterized novelty and reference numerals are merely for convenience and are not to be in any way limiting, the invention may be practiced otherwise than as specifically described.

What is claimed is:

1. A hybrid track assembly for omnidirectional movement of a vehicle (10) over a surface by mounting a hybrid track assembly to each side of a vehicle (10) for cooperating to steer the vehicle (10), said hybrid track assembly comprising:

a first lead track (14) having a longitudinal axis entrained about a first plurality of wheels (16) and a second lead track (18) having a longitudinal axis entrained about a second plurality of wheels (20), said longitudinal axes of said tracks being parallel, a plurality of first lead rollers (26) rotatably supported in spaced and parallel relationship to one another along the longitudinal axis of said first lead track (14), each of said first lead rollers (26) being supported for rotation about a first lead axis, a plurality of second lead rollers (38) rotatably supported in spaced and parallel relationship to one another along the longitudinal axis of said second lead track (18), each of said second lead rollers (38) being supported for rotation about a second lead axis, said assembly characterized by said first and second lead axes of the first lead rollers (26) and second lead rollers (38) respectively being disposed at an angle relative to each other.

2. An assembly as set forth in claim 1 wherein said first and second lead axes are disposed at an angle between 30° and 60° relative to said longitudinal axes of said tracks.

3. An assembly as set forth in claim 1 wherein said first lead axis is disposed at an angle of 90° relative to said second lead axis.

4. An assembly as set forth in claim 1 wherein said first lead axis is disposed at an angle of 45° relative to said longitudinal axis of said first track and said second lead axis is disposed at an angle of 45° relative to said longitudinal axis of said second track, said first and lead axes being disposed at an angle of 90° relative to one another.

5. An assembly as set forth in claim 1 wherein one of said wheels (16) supporting said first lead track (14) is a first drive wheel for moving said first lead track (14) and one of said wheels (20) supporting said second lead track (18) is a second drive wheel for moving said second lead track (18), and including a first drive connection for driving said first drive wheel and said first lead track (14) independently of said second lead track (18) and a second drive connection for driving said second drive wheel and said second lead track (18) independently of said first lead track (14).

6. An omnidirectional vehicle (10) having a longitudinal axis and comprising:

a pair of hybrid track assemblies (12) mounted on opposite sides of said longitudinal axis of said vehicle (10) for cooperating to steer the vehicle (10);

each of said hybrid track assemblies (12) including a first lead track (14) having a longitudinal axis entrained about a first plurality of wheels (16) and a second lead track (18) having a longitudinal axis entrained about a second plurality of wheels (20), said longitudinal axes of said tracks being parallel, a plurality of first lead rollers (26) rotatably supported in spaced and parallel relationship to one another along the longitudinal axis of said first lead track (14), each of said first lead rollers (26) being supported for rotation about a first lead axis, a plurality of second lead rollers (38) rotatably supported in spaced and parallel relationship to one another along the longitudinal axis of said second lead track (18), each of said second lead rollers (38) being supported for rotation about a second lead axis, said assembly characterized by said first and second lead axes of the first lead rollers (26) and second lead rollers (38) respectively being disposed at am angle relative to each other with said lead axes of said first lead rollers (26) of one pair of track assemblies (12) being parallel to said lead axes of said first lead rollers (26) of the other pair of track assemblies (12) and said lead axes of said second lead rollers (26) of said one pair of track assemblies (12) being parallel to said lead axes of said second lead rollers (26) of said other pair of track assemblies (12).

7. An assembly as set forth in claim 6 wherein said first and second lead axes are disposed at an angle between 30° and 60° relative to said longitudinal axes of said tracks.

8. An assembly as set forth in claim 6 wherein said first lead axis is disposed at an angle of 90° relative to said second lead axis.

9. An assembly as set forth in claim 6 wherein said first lead axis is disposed at an angle of 45° relative to said longitudinal axis of said first track and said second lead axis is disposed at an angle of 45° relative to said longitudinal axis of said second track, said first and lead axes being disposed at an angle of 90° relative to one another.

10. An assembly as set forth in claim 6 wherein one of said wheels (16) supporting said first lead track (14) is a first drive wheel for moving said first lead track (14) and one of said wheels (20) supporting said second lead track (18) is a second drive wheel for moving said second lead track (18), and including a first drive connection for driving said first drive wheel and said first lead track (14) independently of said second lead track (18) and a second drive connection for driving said second drive wheel and said second lead track (18) independently of said first lead track (14).

11. An assembly as set forth in claim 10 wherein said first drive connection associated with said first lead track (14) on one side of said vehicle (10) is independent of said first drive connection associated with said first lead track (14) on the other side of said vehicle (10) and said second drive connection associated with said second lead track (18) on said one side of said vehicle (10) is independent of said second drive connection associated with said second lead track (18) on said other side of said vehicle (10).

* * * * *